US008412650B2

(12) United States Patent
Takamatsu

(10) Patent No.: US 8,412,650 B2
(45) Date of Patent: Apr. 2, 2013

(54) DEVICE AND METHOD AND PROGRAM OF TEXT ANALYSIS BASED ON CHANGE POINTS OF TIME-SERIES SIGNALS

(75) Inventor: Shingo Takamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 12/717,834

(22) Filed: Mar. 4, 2010

(65) Prior Publication Data

US 2010/0235308 A1 Sep. 16, 2010

(30) Foreign Application Priority Data

Mar. 11, 2009 (JP) ................................ P2009-057939

(51) Int. Cl.
*G06F 15/18* (2006.01)
(52) U.S. Cl. ......................................................... 706/12
(58) Field of Classification Search .................... None
See application file for complete search history.

(56) References Cited

U.S. PATENT DOCUMENTS 7,490,122 B2 * 2/2009 Horvitz et al. ................ 709/200
2004/0025180 A1 * 2/2004 Begeja et al. ................... 725/46
2006/0143558 A1 * 6/2006 Albornoz et al. .............. 715/512

FOREIGN PATENT DOCUMENTS

JP 10-154150 6/1998

* cited by examiner

*Primary Examiner* — David R Vincent
*Assistant Examiner* — Li-Wu Chang
(74) *Attorney, Agent, or Firm* — Finnegan, Henderson, Farabow, Garrett & Dunner, L.L.P.

(57) ABSTRACT

A text analysis device includes a storage unit configured to store opinions of users who participate in a discussion about a predetermined theme as text data and author information for specifying authors of the text data, a feature quantity data generation unit configured to generate feature quantity data of the text data stored in the storage unit, an observation time-series signal generation unit configured to generate observation time-series signals based on information obtained by performing a predetermined process with respect to the feature quantity data, a change point detection unit configured to detect a change point of the discussion based on the observation time-series signals, and an influence specifying unit configured to specify an opinion having influence on an opinion corresponding to the specified text data out of opinions of the discussion based on the detected change point and the author information.

9 Claims, 12 Drawing Sheets

FIG. 2

TEXT 1: ○○MANAGER SHOULD BE REPLACED.
TEXT 2: IT IS STRANGE THAT ×× IS NOT A STARTING MEMBER.
...

| | "MANAGER" | "TOKYO" | ×× | ... | "REPLACEMENT" |
|---|---|---|---|---|---|
| TEXT 1 | 1 | 0 | 0 | ... | 1 |
| TEXT 2 | 0 | 0 | 1 | ... | 0 |
| ... | ... | ... | ... | ... | ... |

FIG. 3

|  | CLUSTER LABEL | "○○ MANAGER REPLACEMENT" |
|---|---|---|
| TEXT 1 | 3 | 1 |
| TEXT 2 | 1 | 4 |
| ⋮ | ⋮ | ⋮ |

FIG. 4

|  | TIME INFORMATION | CLUSTER LABEL | "○○ MANAGER REPLACEMENT" |
|---|---|---|---|
| ⋮ | ⋮ | ⋮ | ⋮ |
| TEXT 1 | 12/5 9:12 | 3 | 1 |
| TEXT 2 | 12/7 13:30 | 1 | 4 |
| ⋮ | ⋮ | ⋮ | ⋮ |

FIG. 5
| | HIDDEN NODE LABEL |
|---|---|
| ⋮ | ⋮ |
| TEXT 1 | 2 |
| TEXT 2 | 1 |
| ⋮ | ⋮ |
FIG. 6
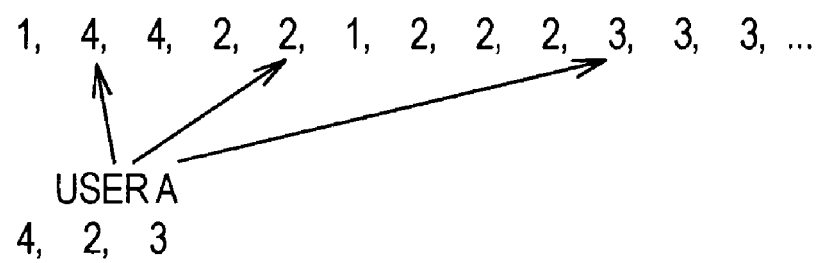
FIG. 7
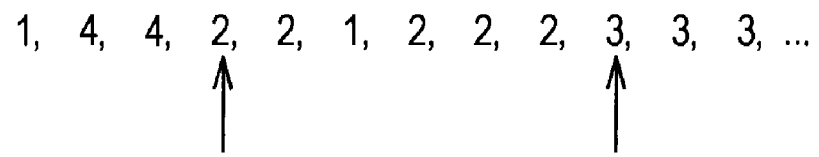

FIG. 15

| "OPINION HAVING INFLUENCE" | ANALYTICAL | DRIVER | AMIABLE | EXPRESSIVE |
|---|---|---|---|---|
| | LITTLE | MUCH | LITTLE | MUCH |
| IS OPINION EASILY CHANGED? | OPINION IS NOT EASILY CHANGED | OPINION IS NOT EASILY CHANGED | OPINION IS EASILY CHANGED | OPINION IS EASILY CHANGED |

DEVICE AND METHOD AND PROGRAM OF TEXT ANALYSIS BASED ON CHANGE POINTS OF TIME-SERIES SIGNALS

BACKGROUND OF THE INVENTION

1. Field of the Invention

The present invention relates to a text analysis device and method and a program, and, more particularly, a text analysis device and method of obtaining an overview of transitions in a personal opinion or interaction between opinions in a text-based discussion so as to more deeply understand the discussion in a short time, and a program.

2. Description of the Related Art

Recently, with development of information processing technology, for example, the opportunity to perform text-based discussions using an electronic bulletin board has increased. In such a case, a document in which an opinion of each user or the like is described is sequentially posted on the electronic bulletin board.

It mostly takes much time to read all documents posted as the text-based discussion. In addition, opinions exchanged in such discussions change with time while influencing each other.

Therefore, a technique of mining discussions using text as an opinion and time information thereof is helpful. A mining method for obtaining an overview of the transitions in a theme based on a text set having time information has been suggested (for example, Japanese Unexamined Patent Application Publication No. 10-154150).

SUMMARY OF THE INVENTION

However, the related art obtains an overview of a tendency of the whole of a given text set, but may not obtain an overview of transitions in a personal opinion or an interaction between opinions in the text-based discussion.

It is desirable to obtain in a short time an overview of the transitions in a personal opinion or an interaction of opinions in a text-based discussion so as to more deeply understand the discussion.

According to an embodiment of the present invention, there is provided a text analysis device including a storage unit configured to store opinions of users who participate in a discussion about a predetermined theme as text data and author information for specifying authors of the text data, a feature quantity data generation unit configured to generate feature quantity data of the text data stored in the storage unit, an observation time-series signal generation unit configured to generate observation time-series signals based on information obtained by performing a predetermined process with respect to the feature quantity data, a change point detection unit configured to detect a change point of the discussion based on the observation time-series signals, and an influence specifying unit configured to specify an opinion having influence on an opinion corresponding to the specified text data out of opinions of the discussion based on the detected change point and the author information.

A user opinion specifying unit configured to specify an opinion of a specified user, out of the users who participate in the discussion, and a display unit configured to display a change in opinion of the specified user based on the detected change point and to display an opinion having influence on the opinion of the specified user or an opinion influenced by the opinion of the specified user may be further included.

The display unit may count and display the number of opinions influenced by the opinion of the user with respect to the users who participate in the discussion.

With respect to the users who participate in the discussion, the number of times the user's opinion changes may be counted, the number of opinions influenced by the opinion of the user may be counted, and the character of the user may be specified based on the number of times of change and the number of opinions counted.

The observation time-series signal generation unit may calculate polarity information of an object to be evaluated, which is set in advance, with respect to the opinions of the text data corresponding to the feature quantity data, based on the feature quantity data, and generate the observation time-series signals based on the calculated polarity information.

A time-series node pattern generation unit configured to specify node labels of a hidden Markov model of the text data and to generate a time-series node pattern in which the node labels are arranged in order corresponding to the observation time-series signals may be further included, and the change point detection unit may detect the change point of the discussion based on the time-series node pattern.

According to another embodiment of the present invention, there is provided a text analysis method including the steps of generating feature quantity data of text data stored in a storage unit which stores opinions of users who participate in a discussion about a predetermined theme as the text data and author information for specifying authors of the text data, generating observation time-series signals based on information obtained by performing a predetermined process with respect to the feature quantity data, detecting a change point of the discussion based on the observation time-series signals, and specifying an opinion having influence on an opinion corresponding to the specified text data out of opinions of the discussion based on the detected change point and the author information.

According to another embodiment of the present invention, there is provided a program which enables a computer as a text analysis device including: a storage unit configured to store opinions of users who participate in a discussion about a predetermined theme as text data and author information for specifying authors of the text data, a feature quantity data generation unit configured to generate feature quantity data of the text data stored in the storage unit, an observation time-series signal generation unit configured to generate observation time-series signals based on information obtained by performing a predetermined process with respect to the feature quantity data, a change point detection unit configured to detect a change point of the discussion based on the observation time-series signals, and an influence specifying unit configured to specify an opinion having influence on an opinion corresponding to the specified text data out of opinions of the discussion based on the detected change point and the author information.

According to another embodiment of the present invention, feature quantity data of text data stored in a storage unit which stores opinions of users who participate in a discussion about a predetermined theme as the text data and author information for specifying authors of the text data is generated, observation time-series signals are generated based on information obtained by performing a predetermined process with respect to the feature quantity data, a change point of the discussion is detected based on the observation time-series signals, and an opinion having influence on an opinion corresponding to the specified text data out of opinions of the discussion is specified based on the detected change point and the author information.

According to the embodiments of the present invention, it is possible to obtain an overview of transitions in a personal opinion or an interaction of opinions in a text-based discussion so as to more deeply understand the discussion in a short time.

BRIEF DESCRIPTION OF THE DRAWINGS

FIG. 2 is a diagram showing an example of a feature quantity vector;

FIG. 3 is a diagram showing an example of conceptual information;

FIG. 4 is a diagram showing an example of learning data;

FIG. 5 is a diagram showing an example of a time-series node pattern;

FIG. 6 is a diagram illustrating an example of extraction of author-based time-series node pattern;

FIG. 7 is a diagram illustrating an example of detection of a change point of discussion;

FIG. 15 is a diagram showing a classification example of the character of a user.

DESCRIPTION OF THE PREFERRED EMBODIMENTS

Hereinafter, embodiments of the present invention will be described with reference to the accompanying drawings.

Figure 1:
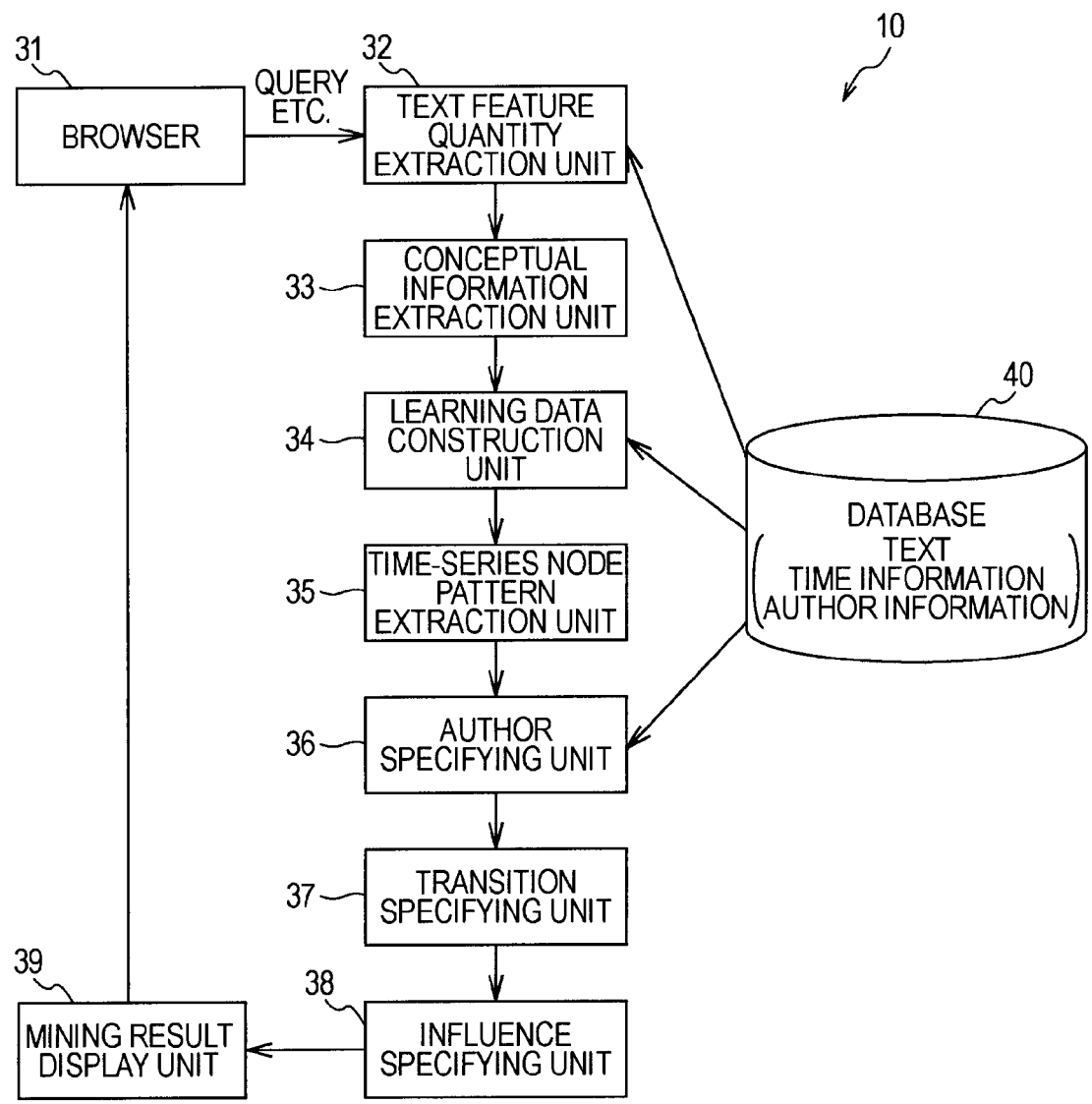
FIG. 1 is a block diagram showing a configuration example of a text mining system according to an embodiment of the present invention.

FIG. 1 is a block diagram showing a configuration example of a text mining system according to an embodiment of the present invention. The text mining system 10 is, for example, composed of a bulletin board on the Internet and a web site for providing a Social Networking Service (SNS). In the bulletin board and the web site configuring the text mining system 10, a plurality of users may discuss, for example, a predetermined theme. The discussion is performed by describing a plurality of characters (by a sentence). That is, in the text mining system 10, text-based discussion is performed by the users.

The text mining system 10 is, for example, composed of a server connected to a network such as the Internet. In addition, the text mining system 10 may be composed of a plurality of servers connected to one another.

In this example, the text mining system 10 include functional blocks denoted by a browser 31 to a database 40.

In the example of FIG. 1, for example, the functional blocks denoted by a text feature quantity extraction unit 32 to the database 40 are mounted in the server. In addition, the functional block denoted by the browser 31 is mounted in a user device such as a personal computer. In addition, the personal computer having the browser 31 and the server having the text feature quantity extraction unit 32 to the database 40 are connected, for example, via the Internet.

In the text mining system 10, for example, a user who accesses the server via the browser 31 mounted in the personal computer or the like inputs his/her screen name and an opinion about the predetermined theme. On a screen of the browser which accesses the server, for example, a contribution acceptance GUI of a Bulletin Board System (BBS) is displayed and a list of previously input opinions is displayed as opinions about the predetermined theme. The opinion input by the user is, for example, stored in the database 40 as text data.

In addition, actually, an opinion uttered as a speech may be converted into text data using a speech recognition technology so as to be stored in the database 40.

In the database 40, the text data of the opinion input by each user is stored in association with time information indicating the input date and time of the opinion and author information such as a screen name. In addition, the text data stored in the database 40 is, for example, stored in a state of being classified based on the theme of the discussion.

The user of the browser 31 may analyze the discussion about the predetermined theme accumulated in the database 40 by the text mining system 10. The text mining system 10 analyzes the discussion about the predetermined theme by performing so-called text mining based on a request from the user of the browser 31. The text mining is data mining using a text.

Text mining is, for example, a technique of representing an evaluation of a product or a service as a numerical value from a text, and extracting (mining) useful information from a text. The user of the browser 31 may individually analyze the writing style organizing a discussion by text mining as a set of text data having time information so as to easily obtain an overview of the transitions in a theme. That is, since a state in which evaluation of a matter or a person of the theme of the discussion changes with time is easily checked by text mining, it is possible to easily obtain an overview of the transitions in the theme.

Details will be described later. The text mining system 10 analyzes the discussion based on a request (query) from the browser 31.

First, the text feature quantity extraction unit 32 extracts respective feature quantities of the text data of the discussion and a conceptual information extraction unit 33 classifies and analyzes the feature quantities and generates conceptual information based on the meanings of the opinions of the text data.

A learning data construction unit 34 and a time-series node pattern extraction unit 35 perform learning of a hidden Markov model so as to obtain a change in node label in time series of the text data of the discussion. That is, the learning data construction unit 34 generates learning data which is an observation time-series signal based on the above-described conceptual information and the time-series node pattern extraction unit 35 learns the observation time-series signal so as to perform a learning process of the hidden Markov model. Therefore, a change in discussion which is an abstract concept may be replaced with, for example, a time-series node pattern as numerical value information.

Based on the time-series node pattern, an author information specifying unit 36, a transition specifying unit 37, an influence specifying unit 38 generate information about transitions in the opinion of a specific user who participates in the discussion or an influence thereof. A mining result display unit 39 presents the information to the browser 31 as an analysis result.

The present invention will be described in more detail with reference to FIG. 1 and FIGS. 2 to 7. If the discussion about the predetermined theme accumulated in the database 40 is analyzed by the text mining system 10, the browser 31 transmits a query or the like to the text feature quantity extraction unit 32 as the request of the analysis of the discussion. The query includes, for example, information for specifying the theme of the analyzed discussion. In addition, the query may include, for example, information (for example, a screen name or the like) for specifying a user to be observed of the users who participate in the discussion.

The text feature quantity extraction unit 32 specifies discussion to be discussed based on information included in the query and reads a set of text data of the specified discussion from the database 40, when the query is received from the browser 31. That is, the text feature quantity extraction unit 32 reads all distributed opinions of the discussion specified by the user of the browser 31 from the database.

In addition, the text feature quantity extraction unit 32 extracts words included in the text data by performing morphological analysis with respect to the read text data. The text feature quantity extraction unit 32, for example, searches directory information previously stored in the database 40 with respect to the extracted words so as to further extract words, which are keywords, of the words. In addition, the text feature quantity extraction unit 32 calculates appearance frequencies of the keywords of the text data and generates a vector having the appearance frequency values of the keywords as elements. This vector is generated with respect to the text data read as the opinion of the discussion and is called a feature quantity vector.

FIG. 2 is a diagram showing an example of a feature quantity vector.

Now, for example, discussion D about the team organization of a certain professional baseball team as a theme is specified and analyzed by a query transmitted from the browser 31. In the discussion D, for example, there are text 1, Text 2, . . . as text data of a distributed opinion.

Text 1 is, for example, text data of a sentence "OO manager should be replaced". Text 2 is, for example, text data of a sentence "It is strange that XX is not a starting member".

Text 1 is morphologically analyzed and the directory information is searched such that keywords "manage" and "replaced" are extracted. Text 2 is morphologically analyzed and the directory information is searched such that a keyword "XX" is extracted. In addition, the text data other than Text 1 and Text 2 is morphologically analyzed and the directory information is searched such that a keyword "Tokyo" is extracted.

As shown in FIG. 2, the text feature amount extraction unit 32 generates feature quantity vectors with respect to the text data read as the opinion of the discussion D. As shown in the same drawing, the feature quantity vectors of Text 1, Text 2, become vectors having elements corresponding to the keywords "manager", "Tokyo", "xx", and "replaced". The values of the elements of the vectors are numerical values representing the appearance frequencies of the keywords. In this example, the appearance frequency corresponding to the keyword "manager" of the feature quantity vector of Text 1 is 1 and the appearance frequency corresponding to the keyword "replaced" is 1. In addition, in this example, the appearance frequency corresponding to the keyword "XX" of the feature quantity vector of Text 2 is 1.

Accordingly, in this example, the feature quantity vector of Text 1 becomes (1, 0, 0, 1) and the feature quantity vector of Text 2 becomes (0, 0, 1, 0).

The text feature quantity extraction unit 32 generates the feature quantity vectors, as described above.

The conceptual information extraction unit 33 classifies the feature quantity vectors by a predetermined criterion and clusters the text data. The conceptual information extraction unit 33, for example, classifies the feature quantity vectors into clusters 1 to 4 based on a sum of the values of the elements of the feature quantity vectors or the like and applies cluster labels representing the clusters to the text data corresponding to the classified feature quantity vectors.

In addition, the conceptual information extraction unit 33 performs text evaluation analysis with respect to the feature quantity vectors as input information. The details of the text evaluation analysis are, for example, disclosed in a document "Research trend into analysis of evaluation information of a text. Natural language processing, Vol. 13, No. 3, 2006.". As the result of text evaluation analysis, polarity information representing whether the opinions of the text data corresponding to the feature quantity vectors are positive or negative with respect to a predetermined object to be evaluated may be obtained. The object to be evaluated is, for example, "OO manager replacement" and is also set as text data. The polarity information is, for example, obtained as a numerical value "1" representing "positive", a numerical value "2" representing "negative", a numerical value "3" representing "neutrality" and a numerical value "4" representing "no opinion".

The conceptual information extraction unit 33, for example, generates a two-dimensional vector having the above-described cluster labels and polarity information as elements, as conceptual information of the text data. FIG. 3 is a diagram showing an example of conceptual information.

In the example of the same drawing, as the two-dimensional vector using the cluster labels and the polarity information of the object to be evaluated "OO manager replacement" as elements, conceptual information of Text 1, Text 2, . . . is shown. In the example of the same drawing, the value of the element of the cluster label of the conceptual information of Text 1 becomes 3 and the value of the element of the polarity information becomes 1. In addition, the value of the element of the cluster label of the conceptual information of Text 2 becomes 1 and the value of the element of the polarity information becomes 4.

The conceptual information is generated in order to confirm the contents of the opinions analyzed as the text data. As described below, learning data is generated based on the conceptual information so as to perform a learning process of a hidden Markov node. Therefore, for example, an extremely abstract concept such as entrance of a speaker (a user who inputs a text) during discussion may be, for example, recognized as the numerical value information.

Although the example of the case where the conceptual information becomes the two-dimensional vector is described herein, a multi-dimensional vector to which other elements are added in addition to the cluster labels and the polarity information may be used.

The learning data construction unit 34 generates learning data for specifying the hidden Markov node by learning in the below-described time-series node pattern extraction unit 35. The learning data is, for example, data obtained by adding time information to the elements of the conceptual information and arranging the elements of the conceptual information in time series.

FIG. 4 is a diagram showing an example of learning data. As shown in the same drawing, the learning data include the time information, the cluster labels and the polarity information of the object to be evaluated "OO manager replacement" as elements. The cluster labels and the polarity information of the object to be evaluated "OO manager replacement" are arranged based on the time information. The time information becomes information indicating a time when the opinions corresponding to Text 1, Text 2, . . . are input in the discussion D, as described above.

The time-series node pattern extraction unit 35 performs a learning process of the hidden Markov model by learning the learning data constructed by the learning data construction unit 34 as the observation time-series signal. In addition, the time-series node pattern extraction unit 35 specifies node labels of Text 1, Text 2 of the learning data. The node labels are, for example, represented by numerical values 1 to 4.

The time-series node pattern extraction unit 35 arranges the specified node labels in time series based on the time information of the learning data so as to extract a time-series node pattern. That is, the time-series node pattern becomes information indicating transition of nodes of the hidden Markov model of Text 1, Text 2, which are the opinions input in the discussion D with time.

For example, in any discussion, input opinions are Text 1 to Text 4 and are temporally input in order of Text 1 to Text 4. If the node label of Text 1 is 2, the node label of Text 2 is 1, the node label of Text 3 is 3, and the node label of Text 4 is 4, the time-series node pattern is represented by a numerical string "2, 1, 3, 4". In an actual time-series node pattern, information for specifying opinions is configured in association with the numerical values (node labels) of the numerical string.

FIG. 5 is a diagram showing an example of a time-series node pattern. In this example, Text 1, Text 2, which are opinions input in the discussion D and the information associated with the node labels of the opinions become the time-series node pattern. In addition, Text 1, Text 2, which are opinions input in the discussion D are temporally input in that order (in order from the top to the bottom of the drawing).

The author specifying unit 36 specifies author information of the numerical values of the numerical string obtained as the time-series node pattern. That is, since the numerical values of the time-series node pattern are the node labels of the hidden Markov model of the opinions input in the discussion D, authors may be specified by the author information of the opinions.

The author specifying unit 36 reads and associates the author information stored in the database 40 in association with the text data of the opinions with the numerical values of the time-series node pattern. For example, the authors of Text 1 to Text 4 of the above-described example are a user A to a user D. In this case, the user A is associated with "2" of the time-series node pattern "2, 1, 3, 4", the user B is associated with "1", the user C is associated with "3", and the user D is associated with "4".

The transition specifying unit 37 specifies transition of the opinions of the users who participate in the discussion, based on the time-series node pattern associated with the author information. The transition specifying unit 37 extracts only the numerical values associated with predetermined author information from the time-series node pattern and extracts an author-based time-series node pattern.

FIG. 6 is a diagram illustrating an example of extraction of author-based time-series node pattern. As shown in the same drawing, for example, the time-series node pattern is "1, 4, 4, 2, 2, 1, 2, 2, 3, 3, 3, . . . " and the author-based time-series node pattern of the user A is extracted. The transition specifying unit 37 extracts the numerical values denoted by arrows of the drawing, based on the author information associated with the time-series node pattern. In this example, the author-based time-series node pattern of the user A becomes "4, 2, 3".

By extracting the author-based time-series node pattern, the transition of the opinion of the author (in this case, the user A) may be recognized.

Alternatively, the transition of the opinions of all the users who participate in the discussion may be specified as follows. The transition specifying unit 37 analyzes the time-series node pattern associated with the author information by a predetermined rule so as to detect a change point in the time-series node pattern. The change point is, for example, an opinion which triggers a large change in flow of the discussion. The predetermined rule is, for example, as follows.

With respect to the numerical values (that is, the node labels) of the time-series node pattern, a time t is set such that a temporally oldest numerical value is set to a time t=1 and an older numerical value is set to a time t=2. When the numerical value of the time t is L(t), a differential def(t, n, m) is calculated by Equation 1 at the time t.

Equation 1

$$def(t, n, m) = \sum_{i=1}^{n} II(L(t) = L(t-n)) + \sum_{i=1}^{m} I(L(t) = L(t+m)) \quad (1)$$

II(*) of Equation 1 is a function which becomes 0 when * is true and becomes 1 when * is false, and I(*) is a function which becomes 1 when * is true and becomes 0 when * becomes false.

The time t when the value calculated by Equation 1 becomes greater than a predetermined threshold is detected as the change point.

For example, in Equation 1, for example, when a variable is m=2, a variable is n=2 and a threshold is 2, if the time-series node pattern shown in FIG. 6 is analyzed by the above-described rule, the node labels corresponding to arrows shown in FIG. 7 are detected as the change point. In the example of FIG. 7, a fourth value "2" from the left of the drawing and a tenth value "3" from the left are detected as the change point.

Accordingly, among the numerical values (node labels) of the time-series node pattern shown in FIG. 6, the tenth value "3" from the left is detected as the change point of all the opinions of the users who participate in the discussion. Accordingly, the transition specifying unit 37 may specify the transition of all the opinions of the users who participate in the discussion.

The influence specifying unit 38 specifies an influenced opinion, based on the change point detected by the transition specifying unit 37. For example, when any opinion is specified, a closest change point becomes an influenced opinion, by going back to the past with the same label as that opinion.

For example, a predetermined opinion of the author-based time-series node pattern of the user A shown in FIG. 6 is specified. Since the author-based time-series node pattern of the user A is "4, 2, 3", the opinions corresponding to the node labels are called Opinion A1, Opinion A2 and Opinion A3. For example, Opinion A2 is specified.

Opinion A2 corresponds to a fifth value "2" from the left in FIG. 7. The influence specifying unit 38 searches for a closest change point by going back to the past with the same node label as Opinion A2. In this case, since the opinion denoted by the arrow of the drawing is the change point, a fourth value "2" from the left is a closest point by going back to the past with the same node label as Opinion A2. Therefore, it may be seen that Opinion A2 is influenced by the opinion corresponding to the fourth value "2" from the left. In other words, it may be considered that the opinion corresponding to the fourth value "2" from the left has influence on the thinking of the user A and the user A inputs the opinion A2.

Therefore, the influence specifying unit 38 specifies the influenced opinion.

The mining result display unit 39 presents information about the transition of the opinions of the users who participate in the discussion specified by the transition specifying unit 37 and the influenced opinion specified by the influence specifying unit 38 to the user as the analysis result of the discussion. The mining result display unit 39 generates and transmits display data of an image displayed on the browser 31, for example, in order to display the image for displaying information, which will be presented to the user, on the browser 31, as the analysis result of the discussion.

Figure 8:
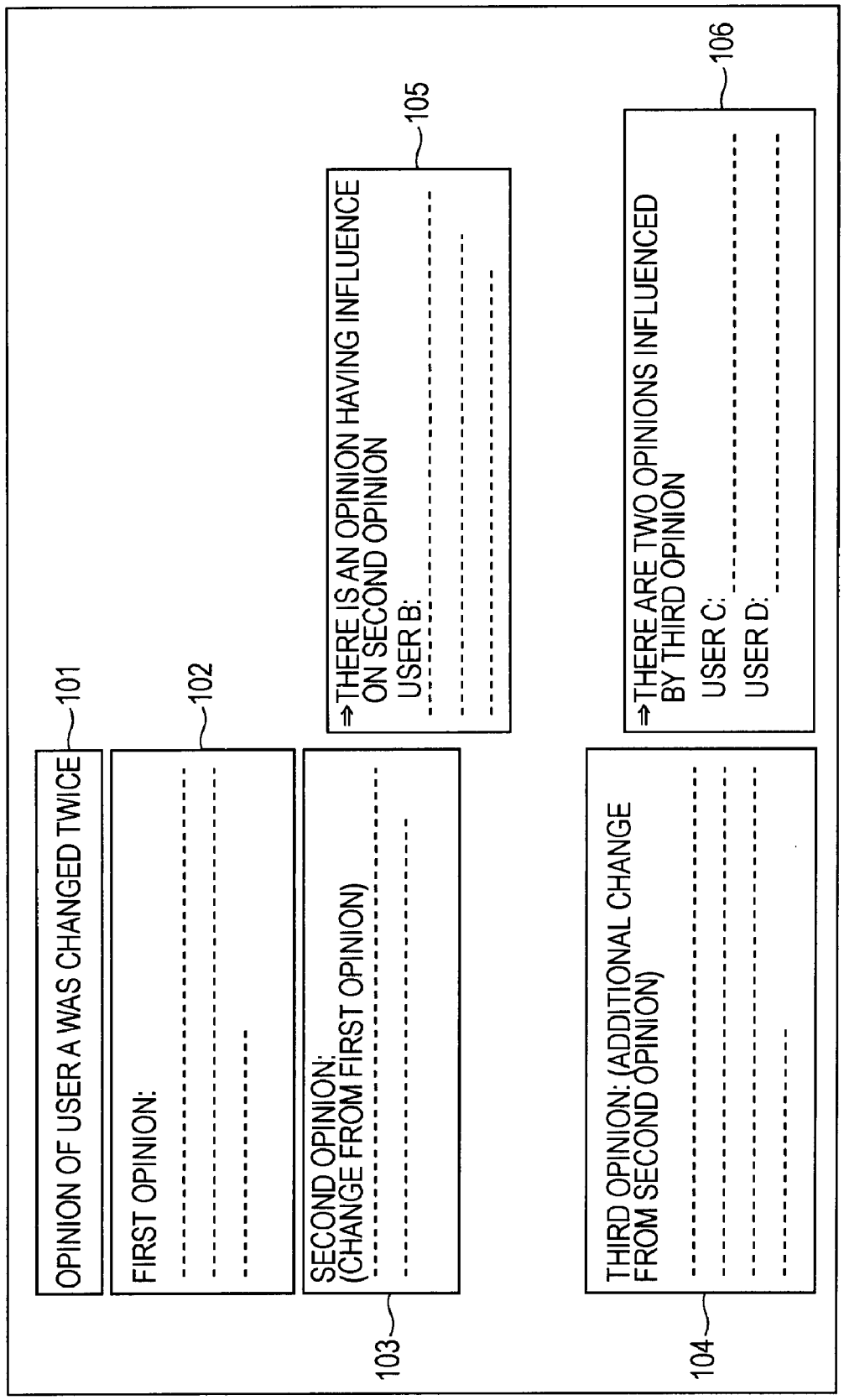
FIG. 8 is a diagram showing an example of an image which displays information to be presented to a user as an analysis result of discussion.

FIG. 8 is a diagram showing an example of an image which displays information to be presented to a user as an analysis result of discussion. For example, information for specifying the theme of the discussion corresponding to the time-series node pattern shown in FIG. 6 and the query including the screen name of the user A as a user to be observed is transmitted by the browser 31. The image shown in FIG. 8 is displayed on the browser 31 as the analysis result of the discussion.

In the example of FIG. 8, "Opinion of the user A was changed twice" is displayed in a region 101 of the image. As described above with reference to FIG. 6, since the author-based time-series node pattern of the user A becomes "4, 2, 3", the opinion of the user A is changed from the node label 4 to the node label 2 and is then changed to the node label 3.

"First opinion" is displayed in a region 102 of the image of FIG. 8 and the contents of that opinion are displayed. In a portion " . . . " of the drawing, a character obtained from the text data of that opinion is displayed. The opinion displayed in the region 102 corresponds to the second value "4" from the left of the time-series node pattern of FIG. 6.

In a region 103 of the image of the FIG. 8, "Second opinion (change from first opinion)" is displayed and the contents of that opinion are displayed. The opinion displayed in the region 103 corresponds to the fifth value "2" from the left of the time-series node pattern of FIG. 6.

In a region 104 of the image of the FIG. 8, "Third opinion (change from second opinion)" is displayed and the contents of that opinion are displayed. The opinion displayed in the region 104 corresponds to the tenth value "3" from the left of the time-series node pattern of FIG. 6.

In a region 105 of the image of the FIG. 8, "There is an opinion having influence on second opinion" is displayed and "user B" and the contents of that opinion are displayed. As described above, the opinion A2 which is the second opinion of the user A is influenced by the opinion corresponding to the fourth value "2" from the left in FIG. 7. Accordingly, in the region 104, the author (user B) of the opinion corresponding to the fourth value "2" from the left and the contents of that opinion are displayed.

In a region 106 of the image of FIG. 8, "There are two opinions on which third opinion has influence" is displayed and "user C", "user B" and the contents of the opinions thereof are displayed. As shown in FIG. 7, the opinion A3 which is the third opinion of the user A becomes a change point shown in the arrow of the drawing. Accordingly, although not shown in FIG. 7, the opinion A3 may have influence on opinions input thereafter. Here, two opinions influenced by the opinion A3 are detected by the processing of the influence specifying unit 38. Therefore, in the region 106, the authors (user C and user D) of the opinions influenced by the third opinion (opinion A3) of the user A and the contents of the opinions thereof are displayed.

The analysis result of the discussion is presented to the user. By specifying and presenting the transition of the opinion of a certain individual (for example, user A) while considering all opinions, it is possible to obtain an overview of the transition of the opinion of that person of all the users which participate in the discussion. In addition, by extracting and presenting an opinion having influence on that person or an opinion influenced by that person, it is possible to deeply understand the discussion.

Figure 9:
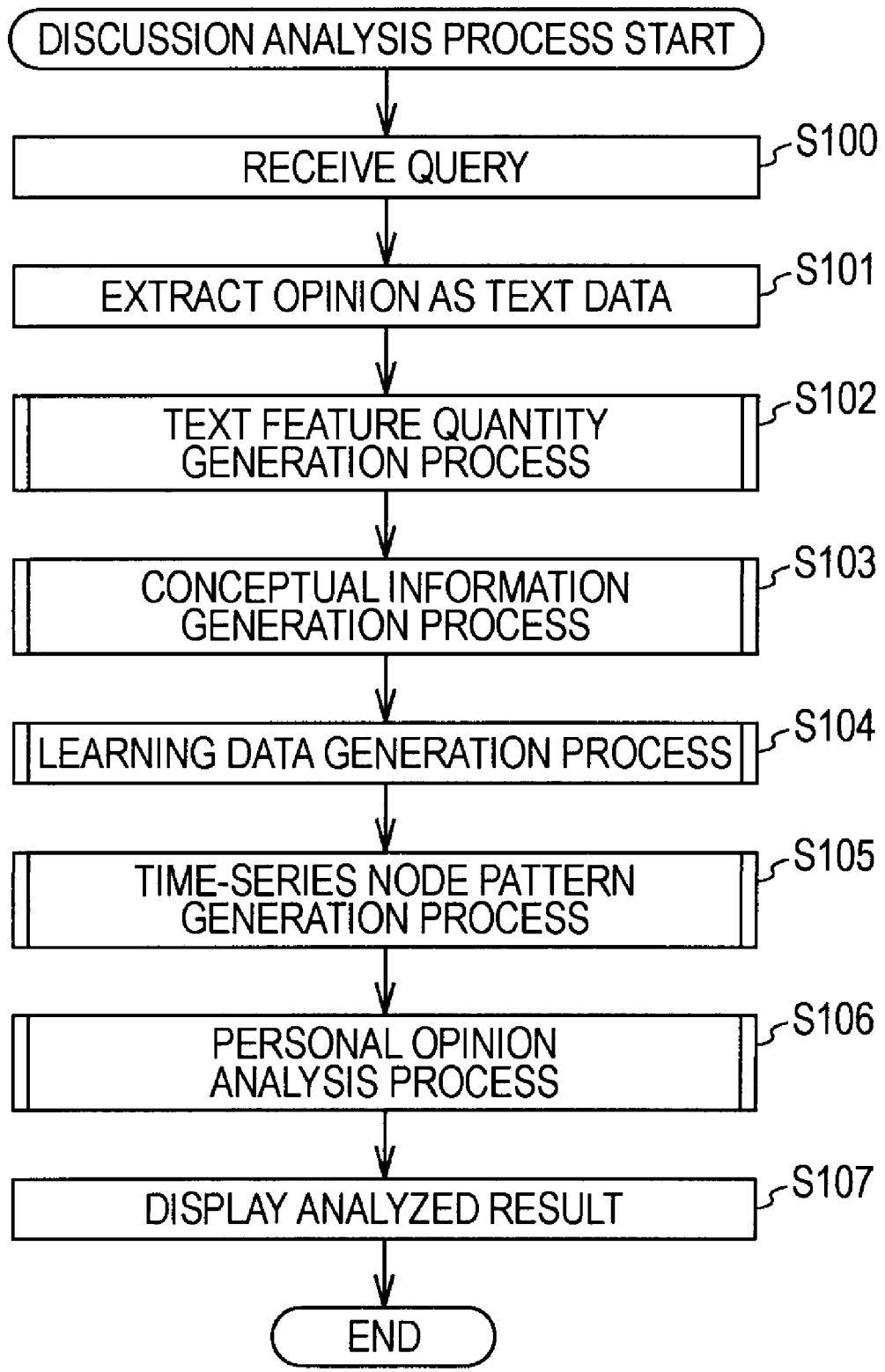
FIG. 9 is a flowchart illustrating an example of a discussion analysis process.

Next, an example of a discussion analysis process using the text mining system 10 will be described with reference to FIG. 9.

In step S100, the text feature quantity extraction unit 32 receives the query from the browser 31 and receives analysis. The query includes information for specifying the discussion to be analyzed and the screen name of the user to be observed.

In step S101, the text feature quantity extraction unit 32 reads specific opinions from the database 40 as a set of text data, based on the query received in step S100.

Figure 10:
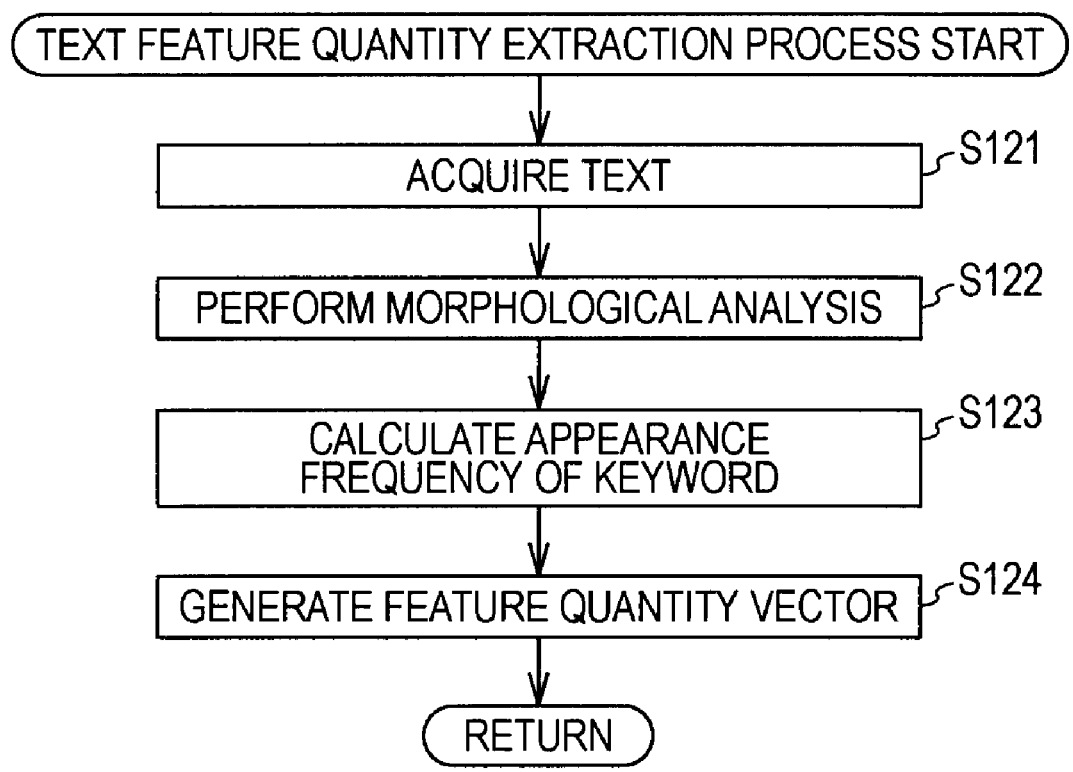
FIG. 10 is a flowchart illustrating an example of a text feature quantity extraction process.

In step S102, the text feature quantity extraction unit 32 executes a text feature quantity generation process which will be described below with reference to FIG. 10. Accordingly, for example, the feature quantity vector which is described above with reference to FIG. 2 is generated.

Now, a detailed example of the text feature quantity generation process of step S102 of FIG. 9 will be described with reference to the flowchart of FIG. 10.

In step S121, the text feature quantity extraction unit 32 acquires one piece of text data of the set of text data read in the process of step S101.

In step S122, the text feature quantity extraction unit 32 morphologically analyzes the text data acquired in the process of step S121. Therefore, words included in the text data are extracted. With respect to the extracted words, for example, the directory information previously stored in the database 40 is searched and the words, which are the keywords, of these words are further extracted.

In step S123, the text feature amount extraction unit 32 calculates the appearance frequencies of the keywords of the text data acquired in the process of step S121.

In step S124, the text feature quantity extraction unit 32 generates the vector having the appearance frequency values of the keywords as elements.

In the processes of step S121 to steps S124 are repeatedly executed in correspondence with the number of pieces of text data read in the process in step S101.

Therefore, for example, the feature quantity vectors shown in FIG. 2 are generated. Thus, the text feature quantity generation process is executed.

Returning to FIG. 9, after the process of step S102, the process progresses to step S103.

Figure 11:
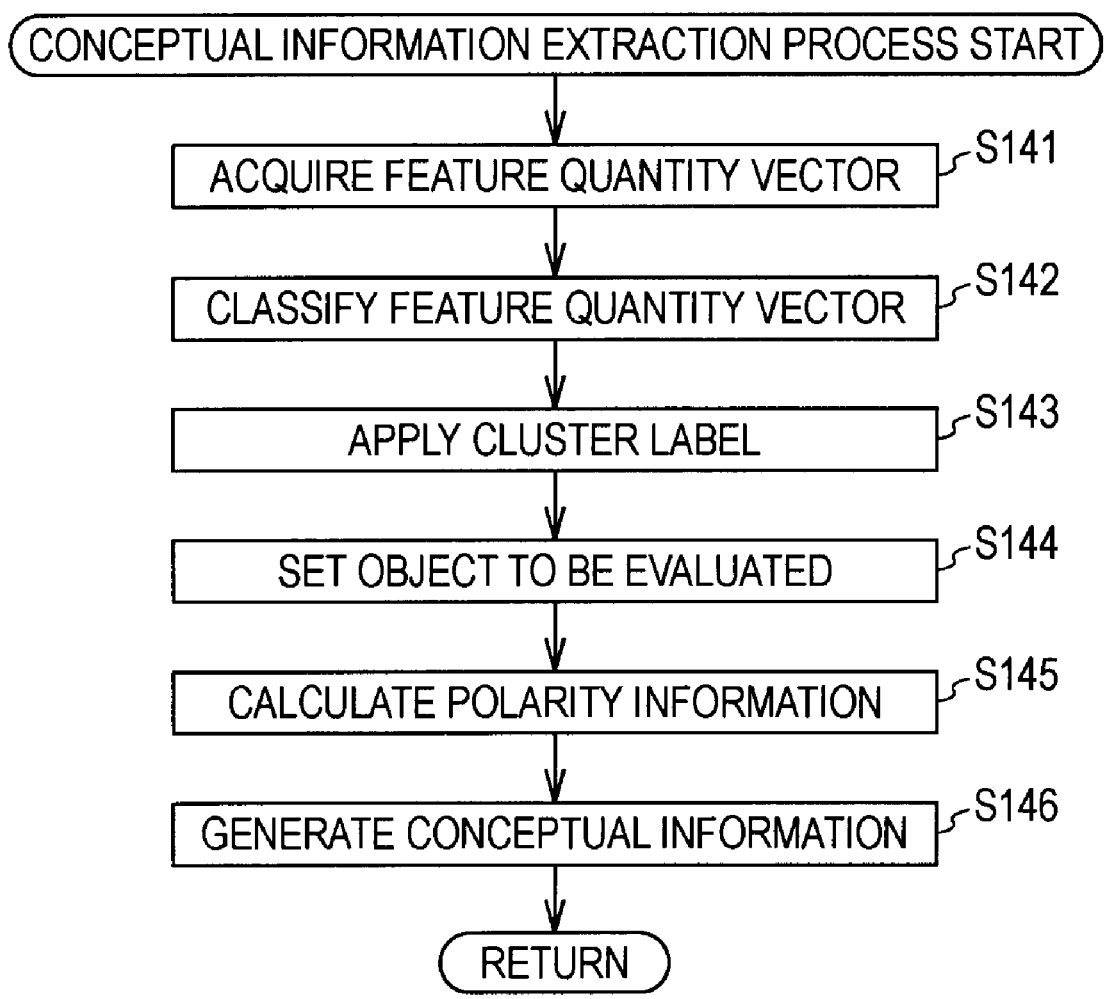
FIG. 11 is a flowchart illustrating an example of a conceptual information extraction process.

In step S103, the conceptual information extraction unit 33 executes a conceptual information generation process which will be described below with reference to FIG. 11. Therefore, for example, the conceptual information which is described above with reference to FIG. 3 is generated.

Now, a detailed example of the conceptual information extraction process of step S103 of FIG. 9 will be described with reference to the flowchart of FIG. 11.

In step S141, the conceptual information extraction unit 33 acquires the feature quantity vectors generated in the process of step S102.

In step S142, the conceptual information extraction unit 33 classifies the feature quantity vectors acquired in the process of step S141 by the predetermined criteria and clusters the text data. At this time, for example, the feature quantity vectors are classified into the clusters 1 to 4 based on the sum of the values of the elements of the feature quantity vectors.

In step S143, the conceptual information extraction unit 33 applies the cluster labels representing the clusters to the text data corresponding to the feature quantity vectors classified in the process of step S142.

In step S144, the conceptual information extraction unit 33 sets the object to be evaluated for performing the text evaluation analysis. The object to be evaluated may be specified, for example, by the user of the browser 31 or may be automatically set.

In step S145, the conceptual information extraction unit 33 calculates the polarity information by performing the text evaluation analysis with respect to the feature quantity vectors acquired in the process of step S141 as the input information. Therefore, the polarity information representing whether the opinions corresponding to the feature quantity vectors acquired in the process of step S141 are positive or negative with respect to the object to be evaluated, which is set in step S144, is obtained. The information is, for example, obtained as a numerical value "1" representing "positive", a numerical value "2" representing "negative", a numerical value "3" representing "neutrality" and a numerical value "4" representing "no opinion".

In step S146, the conceptual information extraction unit 33 generates the two-dimensional vector having the above-described cluster labels and polarity information as elements, as conceptual information of the text data.

The processes of steps S141 to steps S146 are repeatedly executed in correspondence with the number of pieces of text data read in the process of step S101.

Therefore, for example, the conceptual information shown in FIG. 3 is generated. Thus, the conceptual information generation process is executed.

Returning to FIG. 9, after the process of step S103, the process progresses to step S104.

Figure 12:
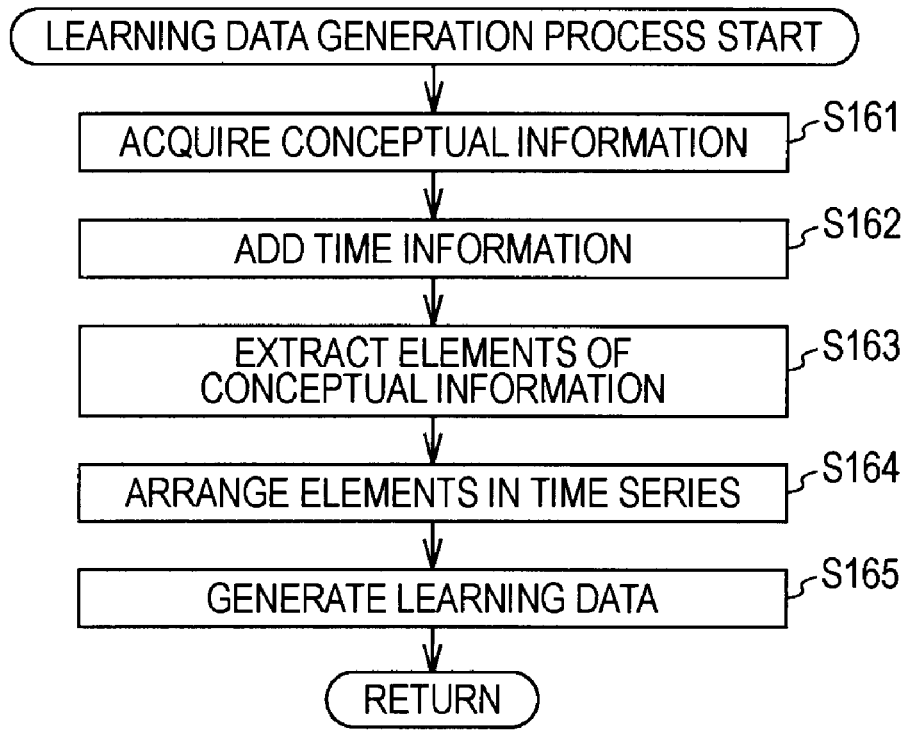
FIG. 12 is a flowchart illustrating an example of a learning data generation process.

In step S104, the learning data construction unit 34 executes a learning data generation process which will be described later with reference to FIG. 12. Therefore, for example, the learning data which is described with reference to FIG. 4 is generated.

Now, a detailed example of the learning data generation process of step S104 of FIG. 9 will be described with reference to the flowchart of FIG. 12.

In step S161, the learning data construction unit 34 acquires the conceptual information generated in the process of step S103.

In step S162, the learning data construction unit 34 adds the time information to the conceptual information generated in the process of step S103.

In step S163, the learning data construction unit 34 extracts the elements of the conceptual information.

In step S164, the learning data construction unit 34 arranges the elements of the conceptual information extracted in the process of step S163 in time series.

In step S165, the learning data construction unit 34 generates the learning information. Therefore, for example, the learning data shown in FIG. 4 is generated.

Accordingly, the learning data generation process is executed.

Returning to FIG. 9, after the process of step S104, the process progresses to step S105.

Figure 13:
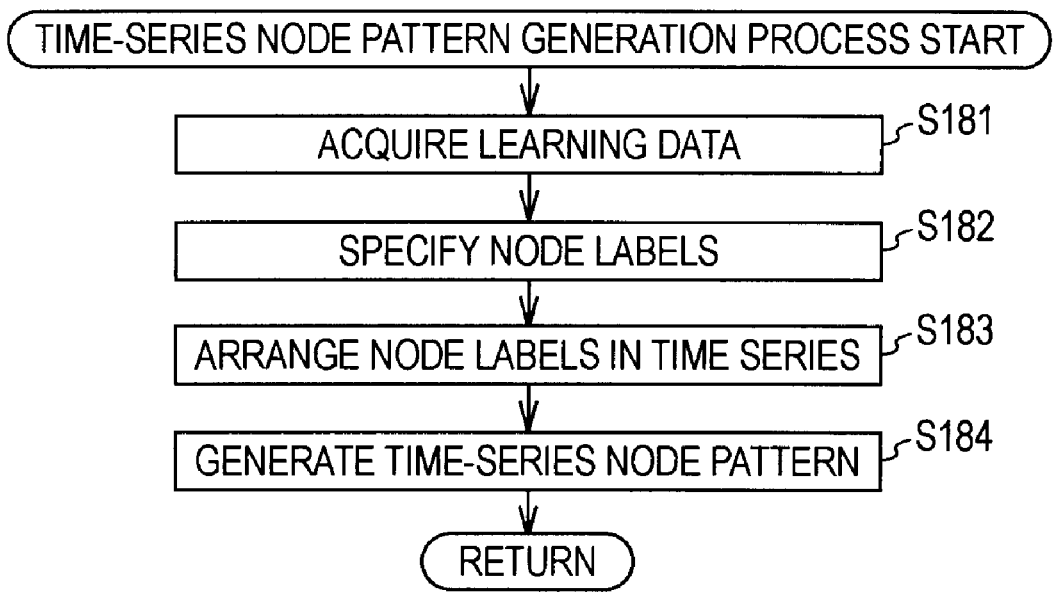
FIG. 13 is a flowchart illustrating an example of a time-series node pattern generation process.

In step S105, the time-series node pattern extraction unit 35 executes a time-series node pattern generation process which will be described later with reference to FIG. 13. Therefore, the above-described time-series node pattern is generated.

Now, a detailed example of the time-series node pattern generation process of step S105 of FIG. 9 will be described with reference to the flowchart of FIG. 13.

In step S181, the time-series node pattern extraction unit 35 acquires the learning data generated in the process of step S104.

In step S182, the time-series node pattern extraction unit 35 performs the learning process of the hidden Markov model by learning the learning data acquired in the process of step S181 as the observation time-series signal. Therefore, the time-series node pattern extraction unit 35, for example, specifies the node labels of Text 1, Text 2, . . . of the learning data of FIG. 4. The node labels are, for example, represented by the numerical values 1 to 4.

In step S183, the time-series node pattern extraction unit 35 arranges the node labels specified in the process of step S182 in time series based on the time information.

In step S184, the time-series node pattern extraction unit 35 generates the time-series node pattern. Therefore, for example, the time-series node pattern shown in FIG. 5 is generated.

Accordingly, the time-series node pattern generation process is executed.

Returning to FIG. 9, after the process of step S105, the process progresses to step S106.

Figure 14:
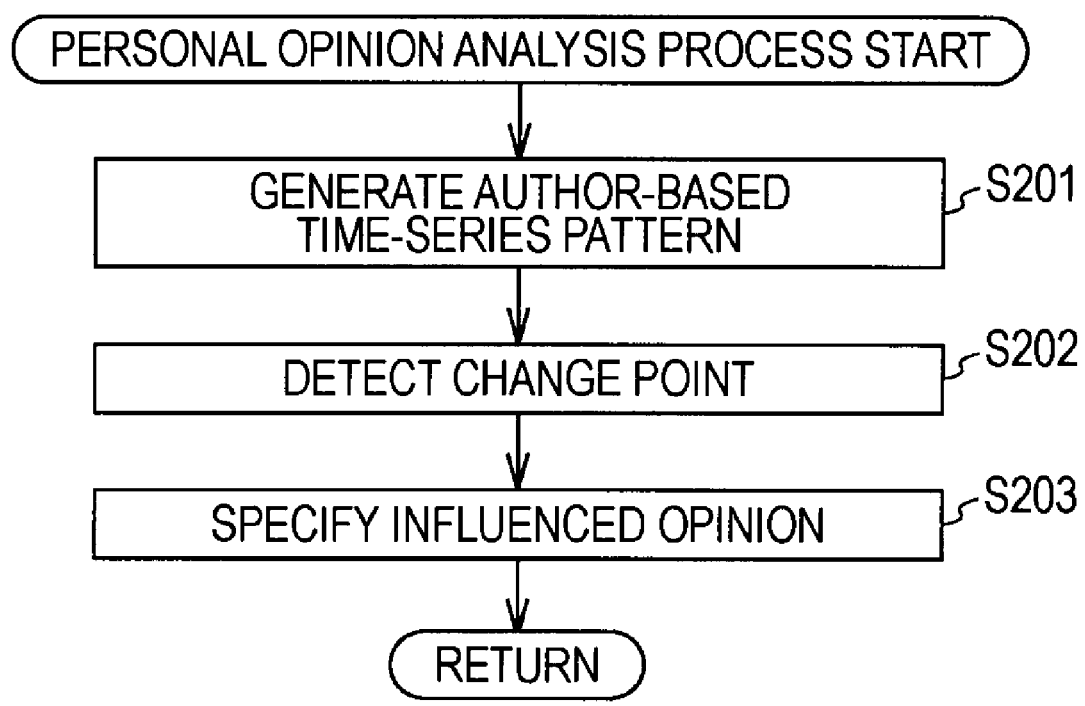
FIG. 14 is a flowchart illustrating an example of a personal opinion analysis process.

In step S106, the author specifying unit 36, the transition specifying unit 37 and the influence specifying unit 38 execute the personal opinion analysis process which will be described later with reference to FIG. 14.

Now, a detailed example of the personal opinion analysis process of step S106 of FIG. 9 will be described with reference to the flowchart of FIG. 14.

In step S201, the author specifying unit 36 and the transition specifying unit 37 generate the author-based time-series node pattern.

At this time, the author specifying unit 36 specifies the author information of the numerical values of the numerical string obtained as the time-series node pattern. The author specifying unit 36 reads the author information stored in the database 40 in association with the text data of the opinions and associates the author information with the numerical values of the time-series node pattern.

The transition specifying unit 37 specifies the transition of the opinions of the users who participate in the discussion based on the time-series node pattern associated with the author information. The transition specifying unit 37 extracts only the numerical values associated with the predetermined author information from the time-series node pattern and extracts the author-based time-series node pattern.

Therefore, for example, as described with reference to FIG. 6, the author-based time-series node pattern is extracted.

In step S202, the transition specifying unit 37 analyzes the time-series node patter associated with the author information by the predetermined rule so as to detect the change point of the time-series node pattern. The change point is, for example, an opinion which triggers a large change in flow of the discussion.

At this time, for example, the time t when the value calculated by Equation 1 becomes greater than a predetermined threshold is detected as the change point.

In step S203, the influence specifying unit 38 specifies the opinion having influence on the opinion of the user to be observed, based on the change point detected in the process of step S202.

At this time, for example, as described above, when any opinion is specified, a closest change point becomes the influenced opinion, by going back to the past. At this time, if the opinion of the user to be observed is the change point, an opinion which has influence on that opinion may be also specified.

Alternatively, for example, as described above, when any opinion is specified, a closest change point becomes an influenced opinion, by going back to the past with the same label as that opinion. At this time, if the opinion of the user to be observed is the change point, an opinion which has influence on that opinion may be also specified.

Accordingly, the personal opinion analysis process is executed.

Returning to FIG. 9, after the process of step S106, the process progresses to step S107.

In step S107, the mining result display unit 39 displays the analysis result based on the information obtained by the process of step S106.

At this time, for example, the display data of the image shown in FIG. 8 is generated and the image shown in FIG. 8 is displayed on the browser 31. That is, in step S107, the mining result display unit 39 presents the information about the transition of the opinions of the users who participate in the discussion specified by the transition specifying unit 37 and the influenced opinion, which is specified by the influence specifying unit 38, to the user.

Accordingly, the discussion analysis process is executed. Thus, the user of the browser 31 more deeply understands the contents of the discussion in a short time.

For example, the related art obtains an overview of a tendency of the whole of the given text set, but may not obtain an overview of transitions in a personal opinion or an interaction between opinions in the text-based discussion.

In contrast, in the present invention, it is possible to view the change point of the personal opinion, the influenced opinion, the influencing opinion and the like by the image of the analysis result. Accordingly, it is possible to deeply understand the contents of the discussion in a short time and to simply confirm the contribution of a participant to the discussion.

In addition, the analysis result obtained by the text mining system 10 of the present invention may be, for example, used as follows.

For example, the text-based discussion of a web site for providing a SNS is analyzed and the number of opinions specified as "influencing opinion" is counted according to authors. That is, the opinion input by that person becomes a change point and the number of opinions having influence on the opinions of other users is specified. In addition, a point indicating the level of the user who writes many opinions specified as "influencing opinion" is increased.

In addition, the number of opinions influenced by the opinion of that person may be further counted so as to be added as a point.

The obtained point is displayed on the web site of the SNS such that a degree of contribution or a degree of power of the user who participates in the SNS may be simply recognized. Accordingly, for example, a user who participates in the SNS later confirms the point of the user who previously participates in the SNS, checks who is an important person, and attends discussion.

Alternatively, the ranking of the points of the users may be displayed on the web site of the SNS.

In addition, for example, in reproduction of video data obtained by filming a conference or the like, the analysis result obtained by the text mining system 10 may be used. In this case, utterance of the conference which is actually held in a conference room is, for example, converted into text data by speech recognition technology so as to perform discussion analysis. In addition, when the recorded video of the conference is reproduced, only a portion of the "influencing opinion" may be reproduced. Accordingly, it is possible to summarize and view the discussion in the conference.

Alternatively, the character of the user may be analyzed using the analysis result obtained by the text mining system 10. For example, it is identified how many "influencing opinions" the user to be observed expresses, based on the analysis result obtained by the text mining system 10. In addition, it is identified whether or not the user to be observed easily changes opinion.

It may be specified whether or not an opinion is easily changed, for example, based on the number of times of change of the node label of the above-described author-based time-series node pattern. In addition, it may be specified how many "influencing opinions" the user expresses by detecting the number of opinions which become change points, out of the opinions of the user to be observed.

The characters of the users to be observed are, for example, classified based on the above-described identified result, as shown in FIG. 15. In the example of FIG. 15, the characters of the users may be classified into four types "Analytical", "Driver", "Amiable" and "Expressive".

A user who hardly expresses "influencing opinions" and does not easily change opinion belongs to the type "Analytical". A user who frequently expresses "influencing opinions" and does not easily change the opinion belongs to the type "Driver". A user who hardly expresses "influencing opinion" and easily changes opinions belongs to the type "Amiable". A user who frequently expresses "influencing opinions" and easily changes opinion belongs to the type "Expressive".

A more significant effect is produced by changing, for example, an advertisement displayed on the web site of the SNS based on the classified result. For example, when the user of the type "Amiable" or the type "Expressive" in which opinion is easily changed is logs in, the advertisement is frequently presented. This is because the effect of the advertisement is expected. Meanwhile, when the user of the type "Analytical" or the type "Driver" in which opinion is not easily changed is logs in, the number of times of presentation of the advertisement is reduced. Since the effect of the advertisement is not expected, the effect in which the troublesomeness of the user is reduced is obtained.

In addition, for example, in the web site of the SNS in which the performance, price or the like of a product is discussed, a mail related to sale of the product may be transmitted to the user belonging to the type "Amiable". This is because the user belonging to the type "Amiable" is a user who having a highest sale effect.

In addition, the above-described series of processes may be executed by hardware or software. If the above-described series of processes are executed by software, a program configuring the software is installed in a computer having dedicated hardware mounted therein or is installed, for example, in a general-purpose personal computer 700 or the like shown in FIG. 16 which may execute various functions by installing various programs, from a network or a recording medium.

Figure 16:
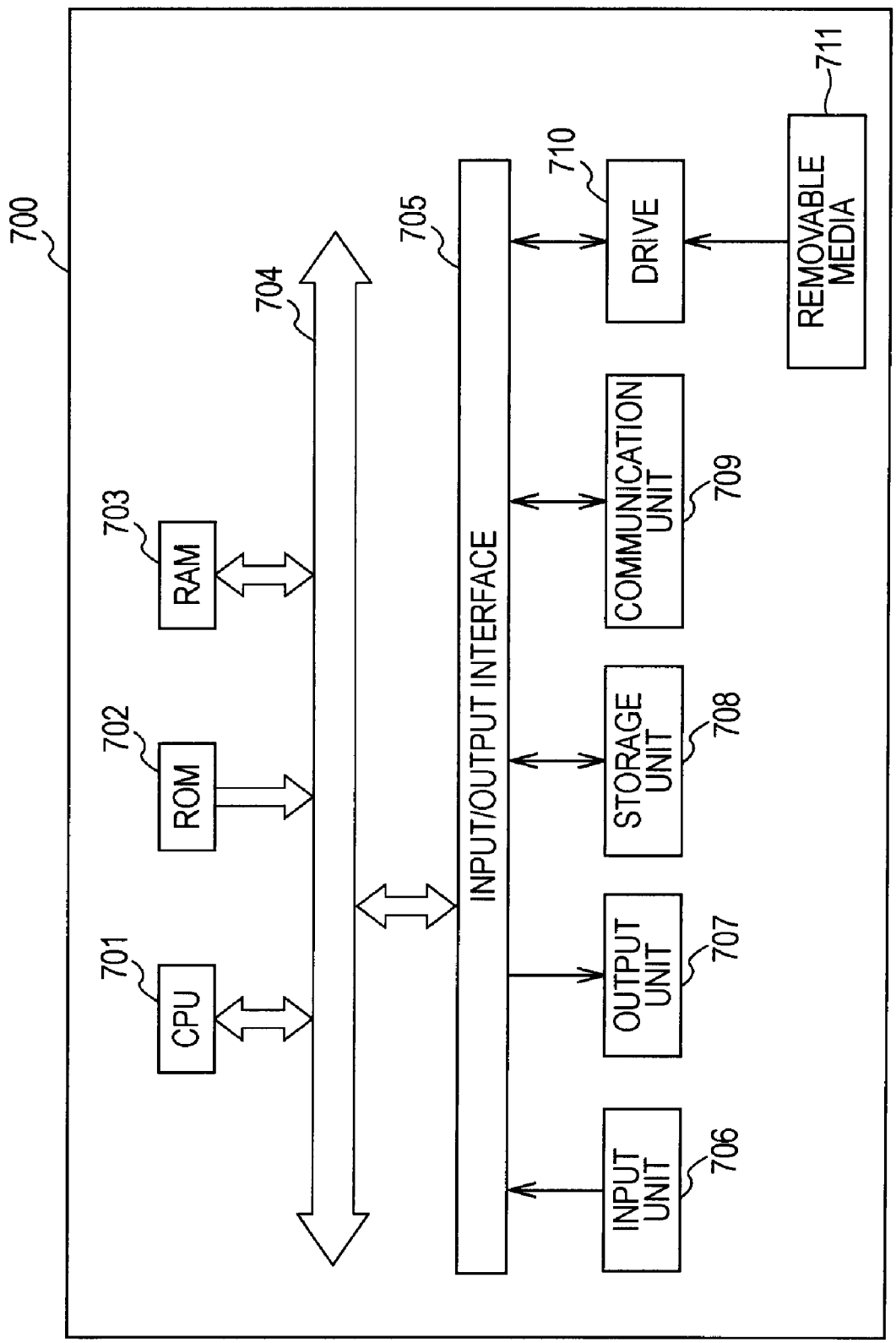
FIG. 16 is a block diagram showing a configuration example of a personal computer.

In FIG. 16, a Central Processing Unit (CPU) 701 executes various processes according to a program stored in a Read Only Memory (ROM) 702 or a program loaded in a Random Access Memory 703 from a storage unit 708. In the RAM 703, data necessary for executing the various processes by the CPU 701 or the like is properly stored.

The CPU 701, the ROM 702 and the RAM 703 are connected to each other via a bus 704. The bus 704 is also connected to an input/output interface 705.

An input unit 706 composed of a keyboard, a mouse and the like, an output unit 707 composed of a display composed of a Liquid Crystal Display (LCD), a speaker and the like, the storage unit 708 composed of a hard disk, and a communication unit 709 composed of a network interface card such as a modem or a LAN card are connected to the input/output interface 705. The communication unit 709 performs a communication process via a network including the Internet.

A drive 710 is connected to the input/output interface 705 if necessary, removable media 711 such as a magnetic disk, an optical disk, a magnetooptical disk, or a semiconductor memory is properly mounted, and a computer program read therefrom is installed in the storage unit 708 if necessary.

The above-described series of processes are executed by software, a program configuring the software is installed from a network such as the Internet or a recording medium composed of the removable media 711 or the like.

The recording medium includes the removable media 711 composed of a magnetic disk (including a floppy disk (registered trademark)), an optical disk (including a Compact Disk-Read Only Memory (CD-ROM) and a Digital Versatile Disk (DVD)), a magnetooptical disk (including a Mini-Disk (MD, registered trademark)), or a semiconductor memory, which is distributed in order to deliver the program to the user, independently of the main body of the device shown in FIG. 16 and also includes the ROM 702 having a program recorded therein or a hard disk included in the storage unit 708, which is delivered to the user in a state of being mounted in the main body of the device in advance.

In addition, in the present specification, the above-described series of processes include processes performed in time series in the above-described order and processes which are not processed in time series and are executed in parallel or individually.

The present application contains subject matter related to that disclosed in Japanese Priority Patent Application JP 2009-057939 filed in the Japan Patent Office on Mar. 11, 2009, the entire content of which is hereby incorporated by reference.

The embodiments of the present invention are not limited to the above-described embodiments and may be variously changed without departing from the scope of the present invention.

What is claimed is:

1. A text analysis device having a physical processor, the device comprising:
   storage means configured to store opinions of users who participate in a discussion about a predetermined theme as text data and author information for specifying authors of the text data;
   feature quantity data generation means performed by the processor and configured to generate feature quantity data of the text data stored in the storage means;
   observation time-series signal generation means performed by the processor and configured to generate observation time-series signals based on information obtained by performing a predetermined process with respect to the feature quantity data;
   time-series node pattern generation means performed by the processor and configured to learn the observation time-series signals to specify node labels of the text data and to generate a time-series node pattern in which the node labels are arranged in order corresponding to the observation time-series signals;
   change point detection means performed by the processor and configured to detect a change point of the discussion based on the time-series node pattern; and
   influence specifying means performed by the processor and configured to specify an opinion having influence on an opinion corresponding to the specified text data out of opinions of the discussion based on the detected change point and the author information.

2. The text analysis device according to claim 1, further comprising:
   user opinion specifying means configured to specify an opinion of a specified user, out of the users who participate in the discussion; and
   display means configured to display a change in opinion of the specified user based on the detected change point and to display an opinion having influence on the opinion of the specified user or an opinion influenced by the opinion of the specified user.

3. The text analysis device according to claim 2, wherein the display means counts and displays the number of opinions influenced by the opinion of the user with respect to the users who participate in the discussion.

4. The text analysis device according to claim 2, wherein, with respect to the user who participate in the discussion,
   the number of times the user's opinion changes is counted,
   the number of opinions influenced by the opinion of the user is counted, and
   the character of the user is specified based on the number of times changed and the number of opinions counted.

5. The text analysis device according to claim 1, wherein the observation time-series signal generation means calculates polarity information of an object to be evaluated, which is set in advance, with respect to the opinions of the text data corresponding to the feature quantity data, based on the feature quantity data, and generates the observation time-series signals based on the calculated polarity information.

6. The text analysis device according to claim 1, wherein the time-series node pattern generation means is configured to learn the observation time-series signal to specify node labels of the text data by a hidden Markov model.

7. A text analysis method comprising the steps of:
   generating feature quantity data of text data stored in storage means which stores opinions of users who participate in a discussion about a predetermined theme as the text data and author information for specifying authors of the text data;
   generating observation time-series signals based on information obtained by performing a predetermined process with respect to the feature quantity data;
   learning the observation time-series signals to specify node labels of the text data;
   generating a time-series node pattern in which the node labels are arranged in order corresponding to the observation time-series signals;
   detecting a change point of the discussion based on the time-series node pattern; and
   specifying an opinion having influence on an opinion corresponding to the specified text data out of opinions of the discussion based on the detected change point and the author information.

8. A non-transitory computer-readable medium storing a program which enables a computer to execute:

generating feature quantity data of text data stored in storage means which stores opinions of users who participate in a discussion about a predetermined theme as text data and author information for specifying authors of the text data;

generating observation time-series signals based on information obtained by performing a predetermined process with respect to the feature quantity data;

learning the observation time-series signals to specify node labels of the text data;

generating a time-series node pattern in which the node labels are arranged in order corresponding to the observation time-series signals;

detecting a change point of the discussion based on the time-series node pattern; and specifying an opinion having influence on an opinion corresponding to the specified text data out of opinions of the discussion based on the detected change point and the author information.

9. A text analysis device comprising:

a storage unit configured to store opinions of users who participate in a discussion about a predetermined theme as text data and author information for specifying authors of the text data;

a feature quantity data generation unit configured to generate feature quantity data of the text data stored in the storage unit;

an observation time-series signal generation unit configured to generate observation time-series signals based on information obtained by performing a predetermined process with respect to the feature quantity data;

a time-series node pattern generation unit configured to learn the observation time-series signals to specify node labels of the text data and to generate a time-series node pattern in which the node labels are arranged in order corresponding to the observation time-series signals;

a change point detection unit configured to detect a change point of the discussion based on the time-series node pattern; and an influence specifying unit configured to specify an opinion having influence on an opinion corresponding to the specified text data out of opinions of the discussion based on the detected change point and the author information.

* * * * *